United States Patent
Lerman et al.

(10) Patent No.: US 6,378,036 B2
(45) Date of Patent: *Apr. 23, 2002

(54) QUEUING ARCHITECTURE INCLUDING A PLURALITY OF QUEUES AND ASSOCIATED METHOD FOR SCHEDULING DISK ACCESS REQUESTS FOR VIDEO CONTENT

(75) Inventors: Jesse S. Lerman, Princeton; Clement G. Taylor, Plainsboro; James Fredrickson, Princeton; Danny Chin, Princeton Jct., all of NJ (US)

(73) Assignee: DIVA Systems Corporation, Redwood City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,512

(22) Filed: Mar. 12, 1999

(51) Int. Cl.[7] .............. G06F 13/14; G06F 13/372; H04N 7/173
(52) U.S. Cl. .......... 711/112; 711/151; 711/158; 710/39; 710/40; 710/54; 725/87; 725/97
(58) Field of Search .................... 711/112, 113, 711/114, 151, 158, 167; 710/39, 40, 44, 54, 52, 57, 6, 5, 45; 348/7; 709/103; 725/87, 92, 94, 97

(56) References Cited

U.S. PATENT DOCUMENTS

| | | | |
|---|---|---|---|
| 5,220,653 A | * 6/1993 | Miro | 709/107 |
| 5,561,456 A | * 10/1996 | Yu | 725/97 |
| 5,644,786 A | * 7/1997 | Gallagher et al. | 710/39 |
| 5,687,390 A | * 11/1997 | McMillan, Jr. | 710/5 |
| 5,721,956 A | * 2/1998 | Martin et al. | 710/52 |
| 5,787,482 A | * 7/1998 | Chen et al. | 711/158 |
| 5,802,394 A | * 9/1998 | Baird et al. | 710/5 |
| 5,870,629 A | * 2/1999 | Borden et al. | 710/44 |
| 5,926,649 A | * 7/1999 | Ma et al. | 710/6 |
| 5,928,327 A | * 7/1999 | Wang et al. | 725/88 |
| 6,023,720 A | * 2/2000 | Aref et al. | 709/103 |
| 6,061,504 A | * 5/2000 | Tzelnic et al. | 711/113 |

* cited by examiner

Primary Examiner—Glenn Gossage
(74) Attorney, Agent, or Firm—Moser, Patterson & Sheridan LLP

(57) ABSTRACT

A queuing architecture and method for scheduling disk drive access requests in a video server. The queuing architecture employs at least two access request queues for each disk drive within a disk drive array, and a queue selector for selecting the first and second queues. The first queue is for disk access requests by steady-state users requesting new data streams who are currently viewing a program from the video server. The second queue is for all other types of disk access requests, including requests by new users, requests for loading content, disk maintenance, meta-data synchronizing, and the like. Steady-state disk access requests are serviced in order of ascending time deadlines. The queue selector gives highest priority to requests in the first queue, and requests from the second queue are serviced only upon a guarantee that all of the steady-state requests in the first queue will meet their time deadlines in the worst case access times for the disk drives. The second queue may comprise multiple queues to provide a queuing hierarchy including a third queue. Non-steady-state disk access requests are serviced on a first-in-first-out basis. The queue selector establishes priority in response to the location of the data upon a disk in a disk drive, and data may be stored in a disk drive based upon the queuing priority. The selecting and forwarding of the access requests to a disk drive may be performed repeatedly while an internet queue within a disk drive is not full, and there are outstanding access requests for that disk drive.

22 Claims, 8 Drawing Sheets

QUEUING ARCHITECTURE INCLUDING A PLURALITY OF QUEUES AND ASSOCIATED METHOD FOR SCHEDULING DISK ACCESS REQUESTS FOR VIDEO CONTENT

The invention relates to methods of scheduling disk access requests in a video server, and, more particularly, to statistical scheduling methods that improve the effective disk bandwidth provided by video servers.

BACKGROUND OF THE DISCLOSURE

Video-on-demand systems allow subscribers to request video programs from a video library at any time for immediate viewing in their homes. Subscribers submit requests to a video service provider via a communication channel (e.g., telephone lines or a back channel through the distribution network that carries the video to the subscriber's home), and the requested video program is routed to the subscriber's home via telephone or coaxial television lines. In order to provide such movie-on-demand services, video service providers use a video server to process subscriber requests, retrieve the requested programs from storage, and distribute the programs to the appropriate subscriber(s). One exemplary system for providing video-on-demand services is described in commonly assigned U.S. Pat. No. 6,253,375, issued Jun. 26, 2001, which is incorporated herein by reference.

In order for video servers to provide good performance, it is crucial to schedule video storage (disk) access requests such that disk bandwidth is maximized. Also, once a subscriber is watching a program, it is imperative to continuously deliver program content to the subscriber without interruption. In addition to distributing content to subscribers, disk bandwidth in a video server is typically also required for operations such as loading content, disk maintenance, and file system meta-data synchronizing. Disk bandwidth may also be reserved for reducing latency in data transfer to subscribers. The number of subscribers that can be properly served concurrently by a video server therefore depends on effective disk bandwidth, which in turn depends on how disk access requests are scheduled.

One of the problems facing current disk scheduling methods is the potential variation in time required to service disk accesses. For example, the internal transfer rate of a SEAGATE CHEETAH® disk varies from 152 Megabits per second (Mbps) on inner tracks to 231 Mbps on outer tracks, and the seek time can vary from 0 milliseconds (ms) to 13 ms depending on how far apart the segments of data are from one another. Given these variations in seek and transfer times and the fact that the server may contain sixteen or more disk drives, it is difficult to determine the effective disk bandwidth of a video server. As a result, current disk scheduling methods allocate a fixed amount of time for every disk access request, regardless of whether the access finishes early. This results in a deterministic system in which the available disk bandwidth is known, but since the fixed amount of time must be large enough to accommodate a worst-case disk access, disk bandwidth is wasted.

Therefore, there is a need in the art for a method and apparatus for scheduling disk access requests in a video server without allocating worst-case access times, thus improving disk bandwidth utilization.

SUMMARY OF THE INVENTION

The disadvantages associated with the prior art are overcome by a method of the present invention, called Statistical Disk Scheduling (SDS), which exploits the fact that disk access times are on average significantly less than the worst case access time. The SDS finds use in improving video server functionality by increasing the bandwidth utilization of the storage medium in the following manner: worst case performance is used for priority operations (e.g., user read operations) but the bandwith created by better than worst case performance is used for non-priority operations such as loading content onto the disk drives and disk maintenance. As a result, bandwidth for loading content and disk maintenance, or file system meta-data synchronizing does not have to be specifically reserved, thus increasing the number of users that can be served simultaneously by the video server.

SDS maintains at least two queues and a queue selector. The first queue is an access request queue for access requests from a current user that are presently viewing a program and the second queue is for all other forms of access requests. The second queue may comprise multiple queues to provide a queuing hierarchy. The requests are ordered in each of the queues to optimize the bandwidth and ensure that the data to the current users is not interrupted such that a display anomaly occurs. The queue selector identifies the queue that will supply the next access request to a disk queue. The selected requests are sent to the disk queues for execution. The disk queues are generally located on the disk drives and are generally not accessible except to place a request in the queue for each disk drive. The requests are then executed on a first-in, first-out (FIFO) manner. In effect, the invention defers disk use to the latest possible moment because once the request is in the disk queue it is more difficult to change. The inventive queue structure provides opportunities to alter the disk access requests and their execution order prior to sending the requests to the disk queue. If a disk queue is not used, i.e., the disk drive does not have an internal queue, then the access requests are sent one at a time from the SDS to the disk drive for execution.

More specifically, the preferred embodiment of the SDS maintains three queues for each disk based on the type and priority of disk access requests, and a queue selector for managing queue selection. Selected requests are forwarded from the three queues to the disk such that bandwidth utilization is maximized, while giving highest priority to subscribers currently viewing a program so that their program streams are generally not interrupted. (Subscribers currently viewing a program are referred to as "steady-state" subscribers.) SDS dynamically monitors bandwidth utilization to determine when lower-priority requests can be scheduled without affecting on-time completion of the higher priority steady-state subscriber requests. In order to keep the disks busy and maximize disk bandwidth utilization, disk command queuing may be employed to ensure that the disk can begin seeking for the next access immediately after it finishes the data transfer for the current disk access.

Furthermore, popular content is migrated to the faster (outer) tracks of the disk drives to reduce the average access time and improve performance.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
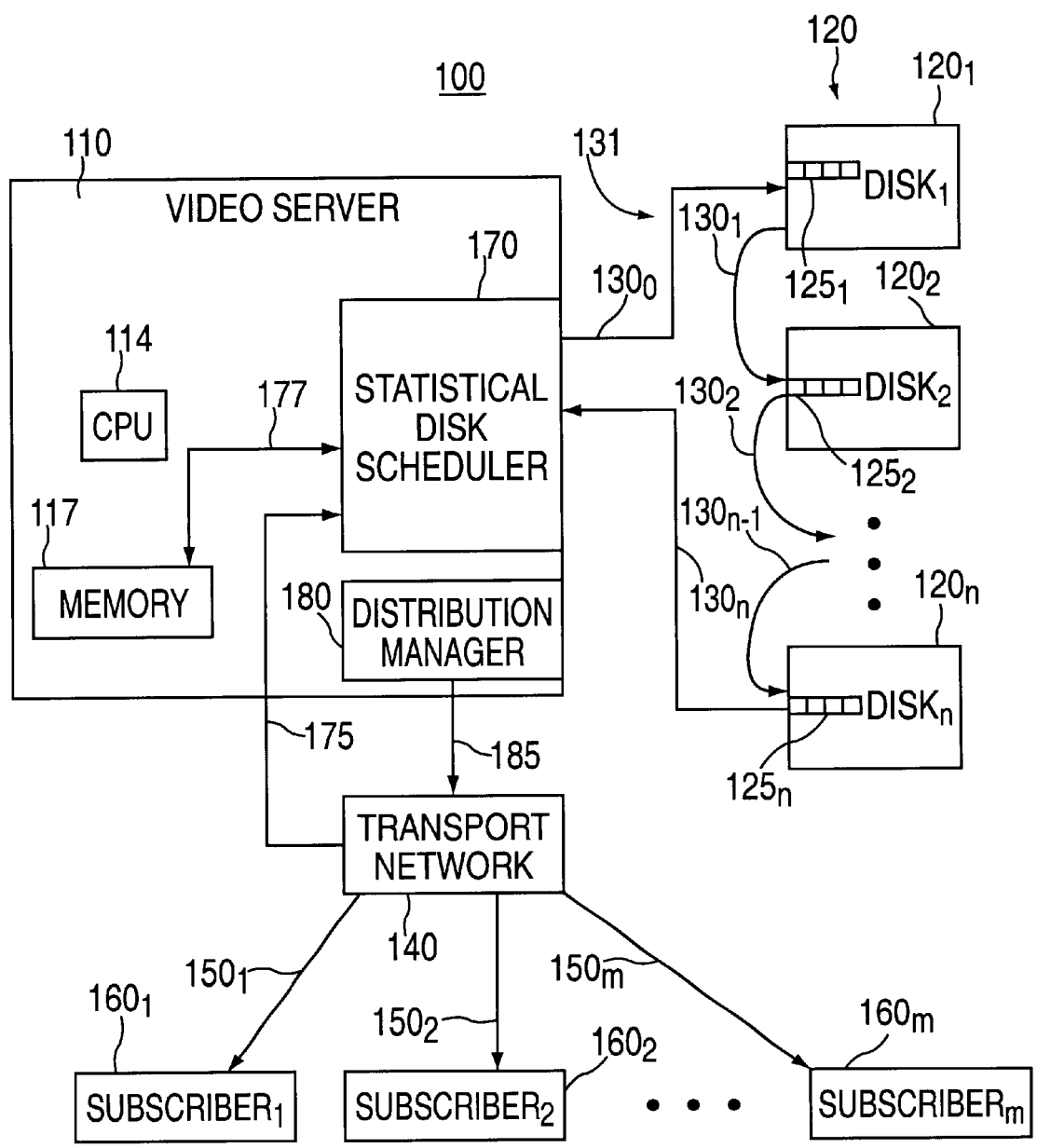
FIG. 1 depicts a high-level block diagram of a video-on-demand system that includes a video server incorporating the present invention.

FIG. 1 depicts a video-on-demand system that utilizes a video server incorporating the teachings of the present invention. Specifically, video-on-demand system 100 contains a video server 110 that communicates with a plurality of disks $120_1$ through $120_n$ (collectively disks 120) via a Statistical Disk Scheduler (SDS) 170. In addition to the SDS 170, video server 110 contains a central processing unit (CPU) 114 and memory element 117. SDS 170 is coupled to disks 120 by paths $130_0$ through $130_n$ (collectively paths 130) (e.g., fiber channel), and to memory 117 by data path 177. The video server sends access requests along paths 130 to disks 120, and each disk 120 has its own internal queue $125_1$ through $125_n$ (collectively queue 125) for buffering access requests. Data read from the disks are transmitted back to the video server along paths 130. The paths 130 are serially coupled, i.e., "daisy chained" to form a data transfer loop 131, e.g., a fiber channel loop. Although one loop is depicted, multiple loops may be employed to interconnect subsets of the disk drives such that the data transfer rate amongst the disk drives and the video server is increased over that of a single loop system. The video server contains a Distribution Manager 180 that receives the data transmitted along paths 130 and loop 131 and distributes this data to subscribers $160_1$ through $160_m$ (collectively subscribers 160) via a transport network 140. Additionally, disks 120 send messages called command completion messages (to be discussed later) to the SDS 170 along paths 130.

The transport network 140 is typically, but not exclusively, a conventional bi-directional hybrid fiber-coaxial cable network. Subscribers 160 are coupled to the transport network 140 by paths $150_1$ through $150_m$ (collectively transport network paths 150) (e.g., coaxial cable). Additionally, transport network 140 forwards subscriber access requests along path 175 to the SDS 170, and receives video data from Distribution Manager 180 via path 185.

Commonly assigned U.S. Pat. No. 6,253,375, issued Jun. 26, 2001, which is incorporated herein by reference, describes an information distribution system, known as the ONSET™ system, which uses a video server that may benefit from the present invention. Additionally, the video server of the ONSET™ system is described in U.S. Pat. Nos. 5,671,377 and 5,581,778 which are both herein incorporated by reference.

Figure 2:
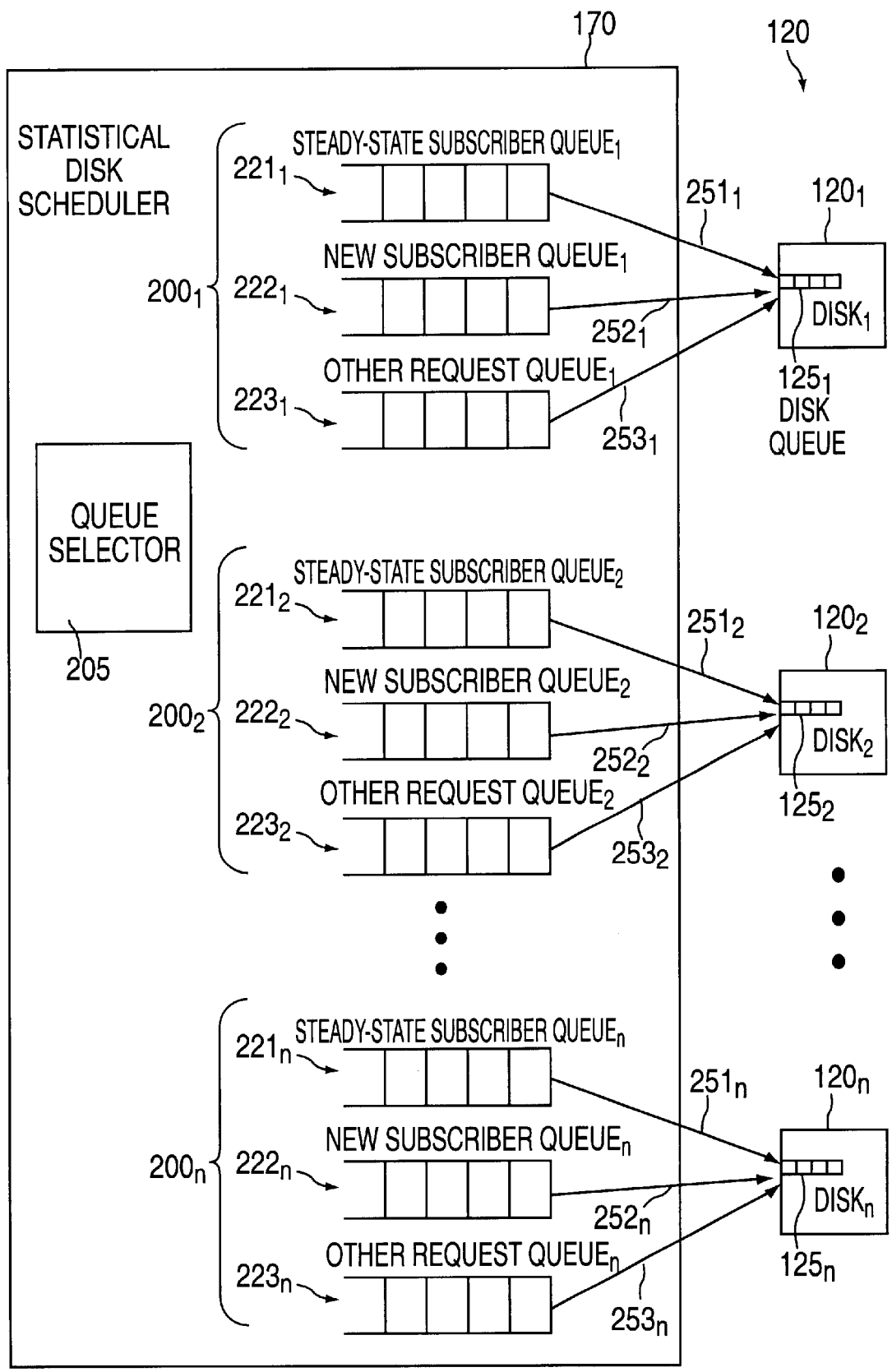
FIG. 2 depicts the queuing architecture of the Statistical Disk Scheduler used to perform the method of the present invention.

The SDS 170 performs the method of the present invention. FIG. 2 depicts a logical representation of the queuing architecture of the Statistical Disk Scheduler (SDS). In a physical representation, the outputs of each queue are connected to the data loop (131 of FIG. 1). In the depicted embodiment, the SDS queuing architecture contains three queues for each disk 120 and a queue selector 205 for managing queue selection, i.e., the queue selector determines which queue is to transfer the next access request to a disk drive. For simplicity, the logical representation is more easily understandable. Although FIG. 2 depicts three queues for each disk drive, a greater or lesser number of queues may be used to fulfill the invention, i.e., at least two queues should be used; one for the "steady-state" requests and one for all other requests.

In the three queue embodiment of the SDS 170, a steady-state subscriber queue (SSQ) $221_1$ through $221_n$ (collectively steady-state subscriber queues 221) is used for "steady-state" subscriber disk reads for active streams (i.e., continuous content retrieval for distribution to subscribers currently watching a program.) Disk access requests in SSQ 221 are assigned the highest priority. A new subscriber queue (NSQ) $222_1$ through $222_n$ (collectively new subscriber queues 222) is for subscriber requests to begin viewing a program or perform other program related commands, i.e., non-steady state commands such as fast forward or rewind that in essence are a request for a new data stream. Disk access requests in NSQ 222 are assigned medium priority. The other request queue (ORQ) $223_1$ through $223_n$ (collectively other request queues 223) is for all non-subscriber operations, such as loading content, disk maintenance, and file system meta-data synchronizing. Disk access requests in ORQ 223 are assigned the lowest priority.

Queues $221_n$, $222_n$, and $223_n$ are collectively called the SDS queues $200_n$, where n is an integer greater than zero that represents a disk drive $120_n$ in an array of disk drives 120. For each disk $120_n$, the queue selector 205 selects requests from the three SDS queues $221_n$, $222_n$, and $223_n$ and forwards the requests to the corresponding disk queue $125_n$ via paths $251_1$ to $251_n$, $252_1$ to $252_n$, and $253_1$ to $253_n$, respectively. Each request has an associated worst-case access time based on the type of request and data transfer size. The worst-case access time can be fixed, or dynamically computed based on prior access time statistics. Additionally, each steady-state subscriber request has a time deadline for when the request must complete in order to guarantee continuous video for that subscriber. Disk requests in the NSQ and ORQ generally do not have time deadlines.

Requests in the SSQ $221_n$ are ordered by time deadline so that the request at the front of the queue has the earliest deadline. Consecutive SSQ requests with the same time deadline are ordered by logical disk block address according to an elevator algorithm. The elevator algorithm is a disk scheduling algorithm well-known in the art in which the disk head travels in one direction over the disk cylinders until there are no more requests that can be serviced by continuing in that direction. At this point, the disk head changes direction and repeats the process, thus traveling back and forth over the disk cylinders as it services requests. Since requests in the NSQ and ORQ do not generally have deadlines, they may be ordered on a first come first serve basis, or according to some other desired priority scheme.

In order to keep the disks 120 busy and maximize disk bandwidth utilization, disk command queuing may be employed to ensure that the disk can begin the seek for the next access immediately after it finishes the data transfer for the current disk access. When a steady-state request needs to access a sequence of multiple disks, the request is initially added to the SSQ $221_1$ of the first disk $120_1$. After this request is selected for servicing by the first disk $120_1$, the request is added to the second disk's SSQ $221_2$ as soon the video server begins sending the data that was recalled from the first disk $120_n$ to the subscriber. Steady-state requests are similarly added to the SSQ $221_n$ of each successive disk $120_n$.

The queue selector 205 employs an SDS Selection Procedure to select requests from the three SDS queues $200_n$ and forward the requests to an associated disk queue $125_n$ located within each of the disk drives $120_n$. The SDS Selection Procedure uses worst-case access times, request priorities, and time deadlines in determining which request to forward to the disk queue. The general strategy of the SDS Selection Procedure is to select a non-SSQ request only when such a selection will not cause any of the SSQ $221_n$ requests to miss their time deadlines, even if the non-SSQ request and all requests in the SSQ $221_n$ were to take their worst-case access times. If such a guarantee cannot be made, then the first request in the SSQ is always selected. As an optional step, once a request is selected, the SDS Selection Procedure checks whether the data for the selected read request is already in cache (if caching is used). If this is the case, the disk access request can be discarded and the Selection Procedure is repeated. Otherwise, the selected request is removed from the SDS queue $221_n$ and forwarded to an associated disk queue $125_n$.

Figure 3:
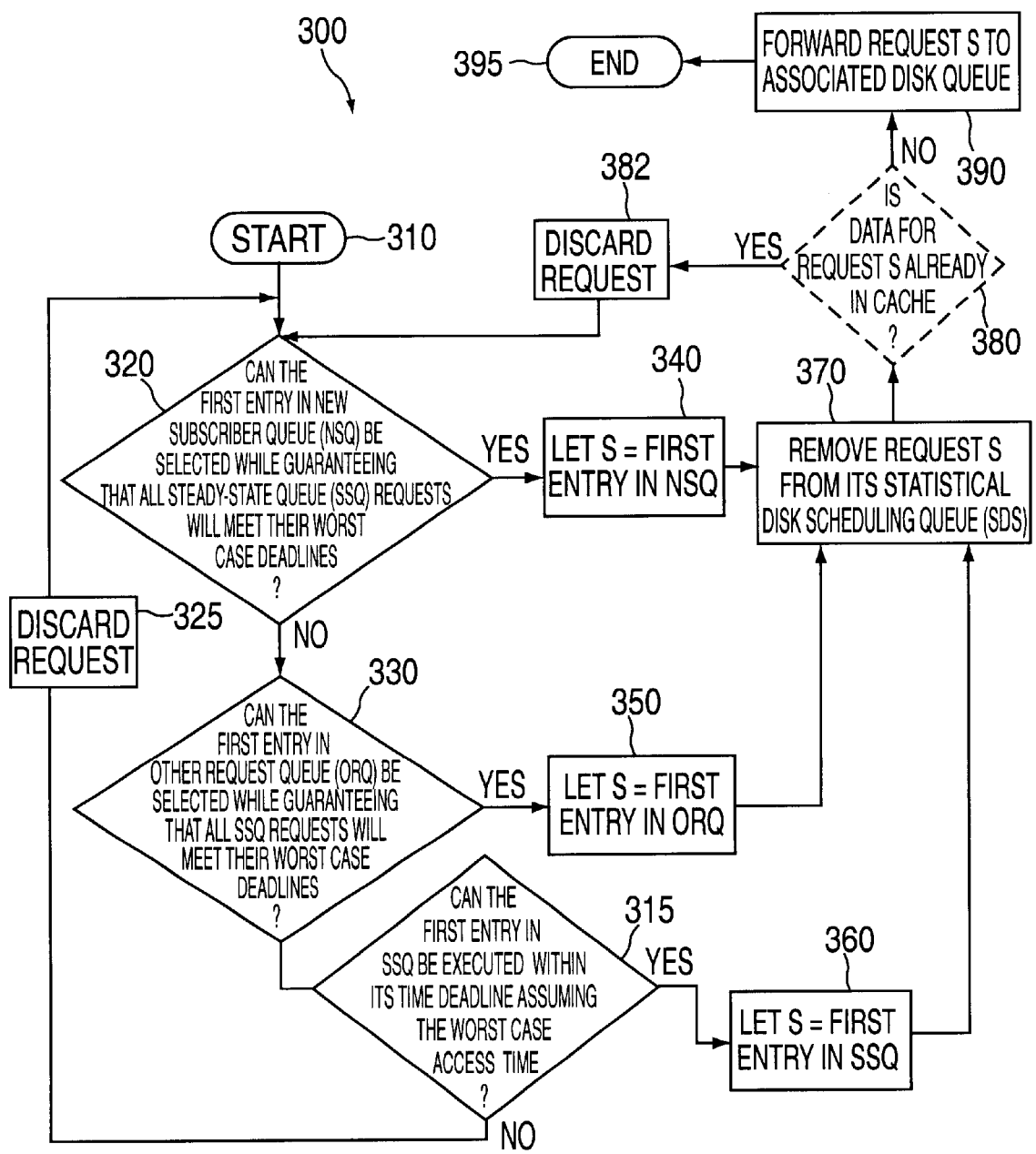
FIG. 3 depicts a flowchart specification of the SDS Selection Procedure.

FIG. 3 depicts a flow diagram of the SDS Selection Procedure 300. First, the Selection Procedure checks whether the first entry in the NSQ can be selected while guaranteeing that all SSQ requests will meet their time deadlines in the worst case (step 320), where worst case is defined by the system. Generally, the worst case value is the access value having a per user error rate that is acceptable.

Each queue maintains "a sum of the worst case values" selector that performs a worst case analysis and selects the queue that will be used (in steps 320 and 330 described below) to send the next command to the disk drive. The following pseudocode represents the operation of such a selector.

1) perform worst case analysis
    returns remaining time (the amount of time left on the SSQ if all commands take worst case time to execute, if the SSQ is empty, the remaining time is infinity)
2) if NSQ is !empty && NSQ.head.worstcase<remaining time
    take request off NRQ
   else if NSQ is empty && ORQ is !empty &&
   ORQ.head.worstcase<remaining time
    take request off ORQ
   else if SSQ is !empty
    take request off SSQ
    if request.deadline−request.worstcase>current time
        request missed deadline, terminate request, try selector again
   else
    no requests pending
Preference is given to the NRQ over the ORQ, only take requests off the ORQ if the NSQ is empty.

The ORQ.head.worstcase and NSQ.head.worstcase are the respective worstcase access times to fulfill the next request in the ORQ and NSQ. The "remaining time" value is computed as follows:

remaining time=disk Q Remaining Time $(SSQ_n)$−disk Q worst case $(PQ_n)$
disk Q Remaining Time (Q, now) {
    sum=0
    min=MAX
    for each entry in Q {
        sum+=entry→worstcase
        left=entry→deadline+sum−now;
        if (left<=0 ||entry→deadline>now) { /*
            out of time */
            min=0;
            break;
        }
        if (min>left)
            min=left; /* there is now less time remaining
            */
    }
    return min;
}

The worst case access time value may be dynamically computed or empirically measured to be a cut off time that defines a period in which accesses have an acceptable error rate. If the first entry fulfills the requirement in step 320, then this first entry is selected (step 340); otherwise, the Selection Procedure checks whether the first entry in the ORQ can be selected while guaranteeing that all SSQ requests will meet their time deadlines in the worst case (step 330). If so, then this first entry is selected (step 350); otherwise, the procedure proceeds to step 315, wherein the procedure queries whether the first entry in the SSQ can be executed within its time deadline assuming the worst case access time. If the request cannot be executed in time, the request is discarded at step 325 and the procedure returns to step 320.

If, however, the request can be executed in the allotted time in step 315, the first entry of the SSQ is selected at step 360. The selected request is then removed from its queue (step 370). Furthermore, if caching is used, the Selection Procedure checks whether data for the selected request is already in cache (step 380) (the caching step 380 is shown in phantom to represent that it is an optional step). If the request is cached, the selected request is discarded and the Selection Procedure is repeated (step 382). Otherwise, the selected request is forwarded to the associated disk queue (step 390).

The SDS executes the Selection Procedure during two scheduling events, called the scheduling interval and the command completion event. The scheduling interval is a fixed, periodic interval, while a command completion event occurs every time one of the disks completes a command. (Note that it is possible, although highly unlikely, that multiple disks complete a command simultaneously at a command completion event.) At each scheduling interval, a procedure called the Scheduling Interval Procedure is executed, and at each command completion event, a procedure called the Command Completion Procedure is executed. In the case that a scheduling interval and a command completion coincide, the Command Completion Procedure is executed first (i.e., the Command Completion Procedure is given priority over the Scheduling Interval Procedure). Alternatively, if the disk queue has a depth that is greater than one, then the execution priority of these routines is reversed. Such reversal leaves more time available to do other operations.

In the Scheduling Interval Procedure, steady-state requests are added to the next SSQ, if possible. (Recall that a steady-state request can be added to the next SSQ as soon as the data is output from the video server to the subscriber), and all SSQs are reordered to maintain correct time deadline order. The first entries in each of the SSQs are then sorted based on time deadlines, which determines the order with which the disks are serviced. For each disk, the Selection Procedure 300 is repeatedly executed as long as the associated disk queue is not full, at least one of the three SDS queues (SSQ, NSQ, ORQ) is not empty, and there is a request in one of the three SDS queues that satisfies the Selection Procedure criteria. For example, if in a three-Disk system when the disk queues are not full the first entry in Disk 1's SSQ has a time deadline of 35, the first entry in Disk 2's SSQ has a time deadline of 28, and the first entry in Disk 3's SSQ has a time deadline of 39, then the disks would be serviced in the following order: Disk 2, Disk 1, Disk 3. Once the disk order has been established, then the SDS Selection Procedure is performed for each disk in that order.

Generally, in a video server application, the extents for the data are very long (e.g., hundreds of kilobytes) such that the disk queues have a depth of one. In other applications using shorter data extents, the disk queues may have various depths, e.g., five requests could be stored and executed in a first-in, first-out (FIFO) manner. The extent size is inversely proportioned to disk queue depth where data delivery latency is the driving force that dictates the use of a large extent size for video server applications. For other applications where the extent size is relatively small, the disk queue depth is dictated by the desire to reduce disk drive idle time.

Figure 4:
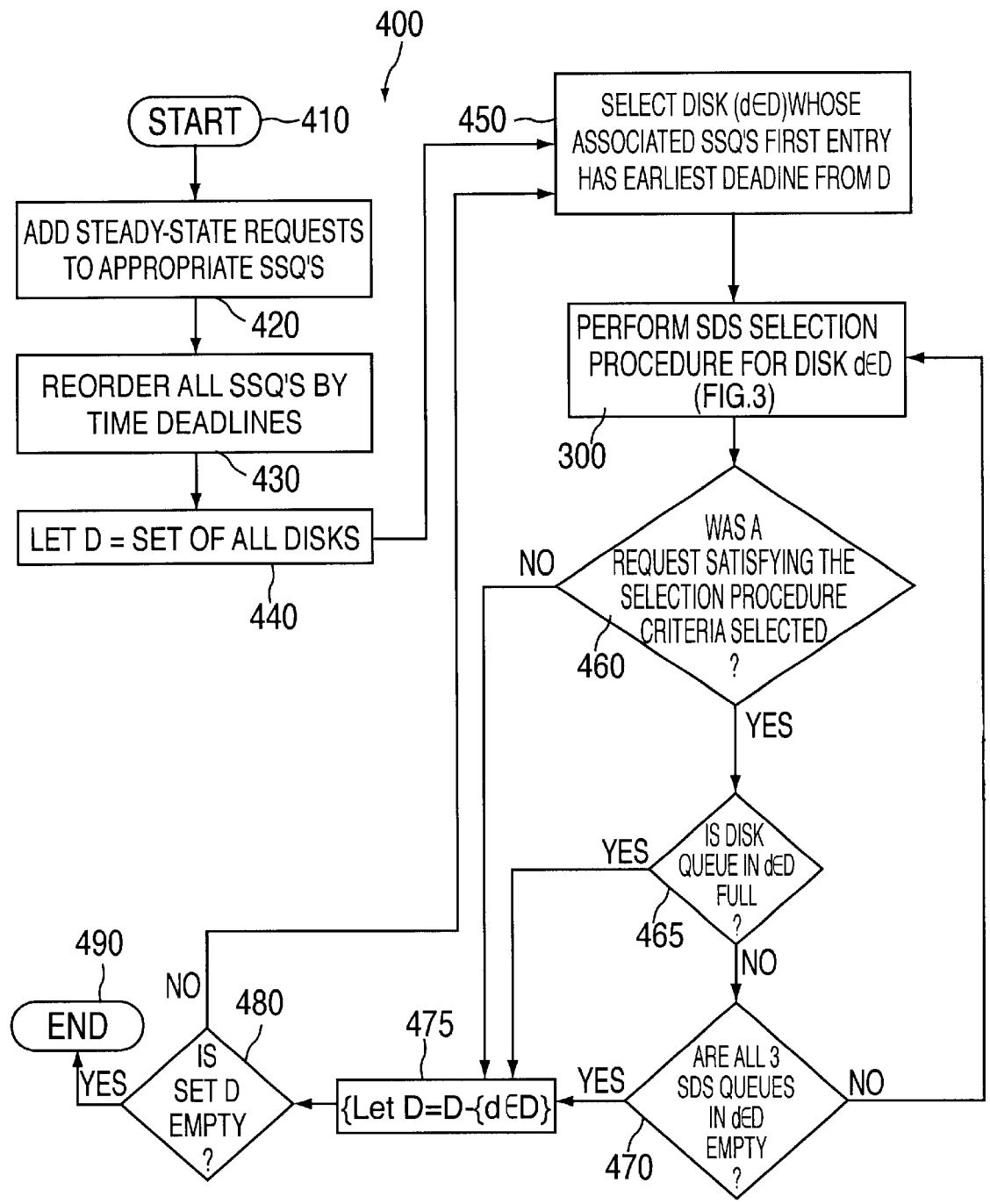
FIG. 4 depicts a flowchart specification of the Scheduling Interval Procedure.

FIG. 4 shows a formal specification of the Scheduling Interval Procedure 400 in flowchart form. First, the Scheduling Interval Procedure adds steady-state requests to the appropriate SSQs, if possible (step 420), and reorders all the SSQs by time deadlines (step 430). The Scheduling Interval Procedure (400) then groups all the disks, where "D"=a set of all of the disks (step 440). The disk that has the earliest deadline for the first entry in its SSQ is then selected (step 450). The Selection Procedure is performed for the selected disk (step 300), and then the Scheduling Interval Procedure checks whether a request satisfying the Selection Procedure criteria was selected (step 460). If not, the disk with the next earliest deadline for the first entry in its SSQ is selected (steps 475, 480, 450), and the Selection Procedure is repeated for this disk (step 300). Otherwise, the Scheduling Interval Procedure checks whether the selected disk's queue is full (step 465), or if all three SDS queues for the selected disk are empty (step 470). If either of these conditions are true, then the disk with the next earliest deadline for the first entry in its associated SSQ is selected (steps 475, 480, 450) and the Selection Procedure is repeated for this disk (step 300). If, however, both conditions are false, the Selection Procedure 300 is repeated for the same selected disk. Thus, the disks are processed sequentially, ordered by the corresponding SSQ's first deadline, where "processing" means that the Selection Procedure is invoked repeatedly until the disk queue is full or there are no more requests for that disk.

As disclosed in FIG. 4, the Scheduling Interval Procedure fills each of the disk queues one at a time, which is most efficient for small disk queues. In the preferred embodiment, a small disk queue is used, as it facilitates the latency reduction. In particular, as soon as the servicing of a request extends past its worst-case access time, the request is aborted by the SDS, i.e., the SDS "times-out" waiting for the request to be serviced and then moves to the next procedural step. To assist in error handling when using a disk queue with a depth that is greater than one, such that the server may determine which request was not fulfilled within a predefined time period, the server maintains a disk mimic queue that mimics the content of the disk queue of each of the disk drives. As such, the server can poll the mimic queue to determine the nature of the errant request and send an "abort" command to the disk drive for that request. The disk drive will then process the next request in the disk queue and the server updates the mimic queue.

Figure 5:
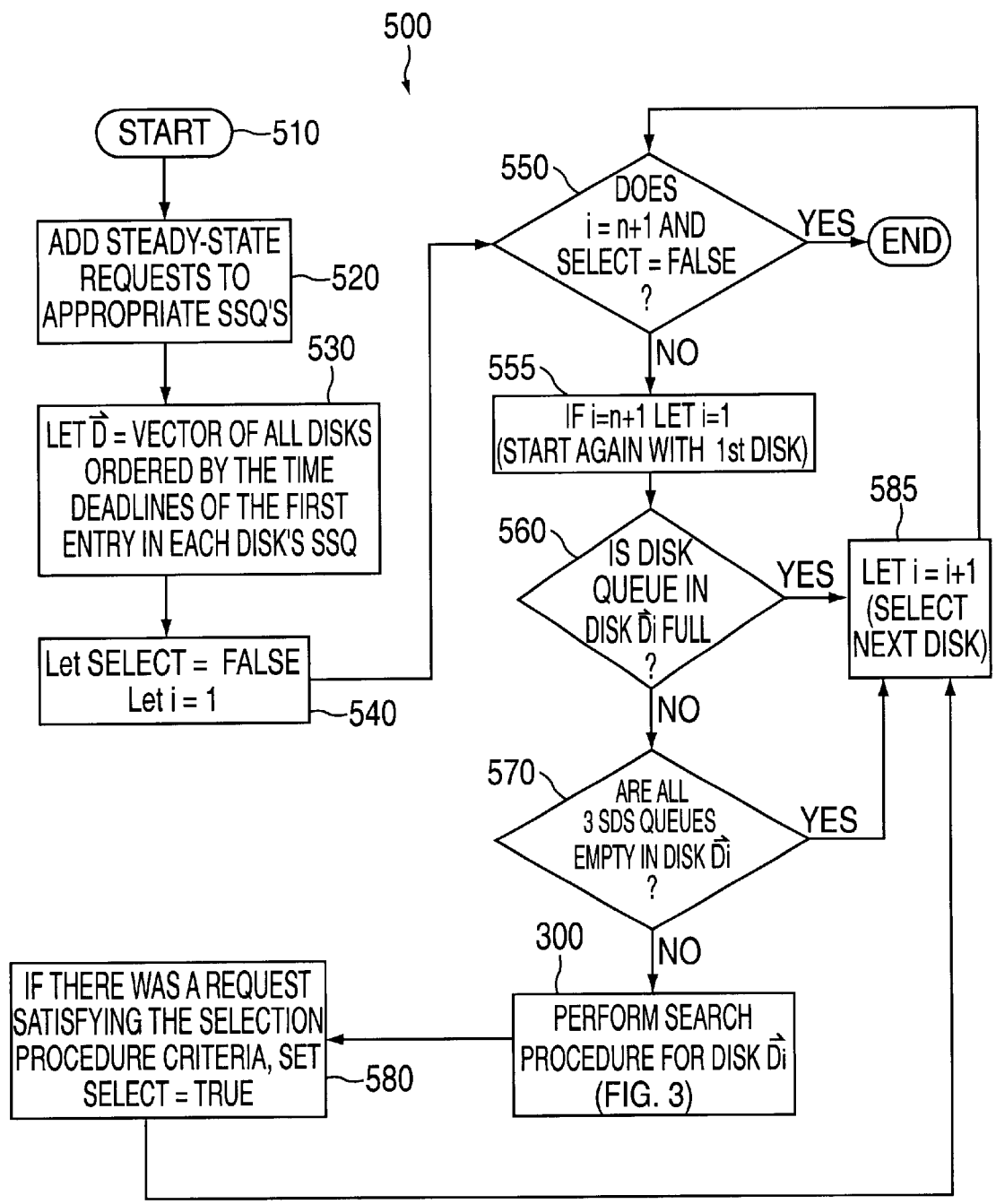
FIG. 5 depicts a round-robin version of the Scheduling Interval Procedure.

In the case of large disk queues, however, filling the disk queues in a round-robin fashion may be more efficient. A round-robin version of the Scheduling Interval Procedure for large disk queues is shown in FIG. 5. As in the previous embodiment of the Scheduling Interval Procedure, steady-state requests are first added to the appropriate SSQs (step 520), and disks are ordered by the deadlines of the first entry in each disk's SSQ. In this round-robin version, however, the Selection Procedure is executed only once for a disk, and then the next disk is selected. Once all disks have been selected, the round-robin Scheduling Interval Procedure goes through each of the disks once again in the same order, executing the Selection Procedure once per disk. This process is continued until no more requests can be added to any of the disk queues.

Specifically, a vector D is defined as an ordered list of all the disks, where the order is based on the time deadlines of the first entry in each disk's SSQ (step 530). A Boolean variable SELECT is initialized to false, and an integer variable i is initialized to 1 (step 540). The following condition is then tested: if i=n+1 and SELECT=false (step 550). As will be seen shortly, this condition will only be true when all of the disks have been selected and no requests could be added to any of the disk's queues. Next (step 555), if i=n+1 (i.e., the last disk had been selected in the previous iteration), then i is set to 1 (start again with the first disk). If disk $D_i$'s disk queue is full (step 560), or all three of $D_i$'s SDS queues are empty (step 570), then the next disk is selected (step 585). The Selection Procedure is performed for $D_i$ (step 300), and if a request satisfying the Selection Procedure criteria was found, SELECT is set to true (step 580), and the next disk is selected (step 585). Thus the SELECT variable indicates whether a request was added to one of the disk queues during a pass over the vector of disks.

Figure 6:
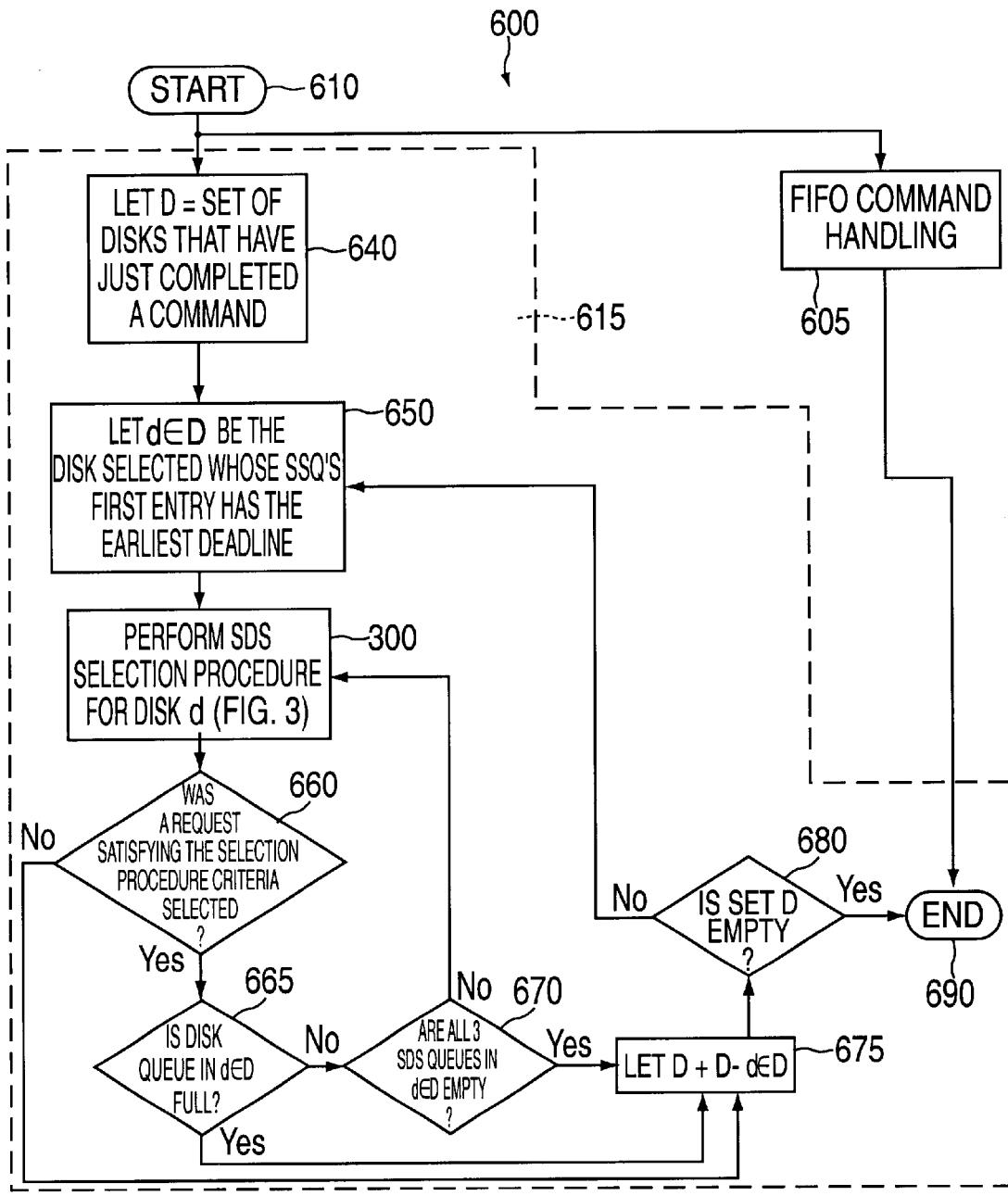
FIG. 6 depicts a flowchart specification of the Command Completion Procedure.

The Command Completion Procedure is executed, on a first-in, first-out basis, every time a disk completes a command. Thus, for each completed command, the Command Completion Procedure executes in the order in which the commands are completed, i.e., using a FIFO command handling step. As shown in FIG. 6, the Command Handling Procedure begins at step 610, proceeds to the FIFO command handling step 605 and ends at step 690.

Alternatively, the procedure can be adapted to handle simultaneous command events. In this procedure, it is first determined if multiple disks have completed a command simultaneously at the command completion event. (Most likely only one disk will have completed a command at the command completion event, but the multiple-disk situation is possible.) If more than one disk has completed a command, then the first entries in the SSQs of these disks are sorted based on time deadlines, thereby determining the order in which the disks are serviced. Once the disk order has been established, the SDS Selection Procedure is performed for each disk in order in the same manner as the Scheduling Interval Procedure (FIG. 3). That is, for each disk, the Selection Procedure is repeatedly executed as long as the associated disk queue is not full, at least one of the three SDS queues (SSQ, NSQ, ORQ) is not empty, and there is a request in one of the three SDS queues that satisfies the Selection Procedure criteria.

A formal specification of both forms of the Command Completion Procedure is shown in flowchart form in FIG. 6.

Step 605 represents the standard FIFO command handling procedure, while the dashed box 615 represents an alternative procedure capable of handling simultaneous command occurrences. In this alternative version, the Command Completion Procedure 600 determines which disks have just completed a command (step 640), and the disk that has the earliest deadline for the first entry in its SSQ is then selected (step 650). Just as in the Scheduling Interval Procedure, the Selection Procedure is performed for the selected disk (step 300), and then the Command Completion Procedure (step 600) checks whether a request satisfying the Selection Procedure criteria was selected (step 660). If not, the disk with the next earliest deadline for the first entry in its SSQ is selected (steps 675, 680, 650) and the Selection Procedure is repeated for this disk (step 300). Otherwise, the Command Completion Procedure checks whether the selected disk's queue is full, or if all three SDS queues for the selected disk are empty. If either of these conditions are true, then the disk with the next earliest deadline for the first entry in its SSQ is selected (steps 675, 680, 650) and the Selection Procedure is repeated for this disk (step 300). If, however, both conditions are false, the Selection Procedure is repeated for the same selected disk.

As disclosed in FIG. 6, the Command Completion Procedure fills each of the disk queues one at a time, i.e., the disk with a complete event is refilled. Note that since it is highly unlikely that more than one disk is serviced on a command completion event, the choice of whether to employ round-robin or sequential filling of the disk queues in the Command Completion Procedure has essentially no impact on performance.

In both the Scheduling Interval and Command Completion Procedures, the ordering of requests within the disk queues are managed by the video server central processing unit (CPU), and not the disks themselves. (Any reordering operations normally performed by the disk must be disabled.) While reordering by the disks would improve the average seek time, managing the disk queues by the CPU is required to preserve the time deadlines of the user requests.

Figure 7:
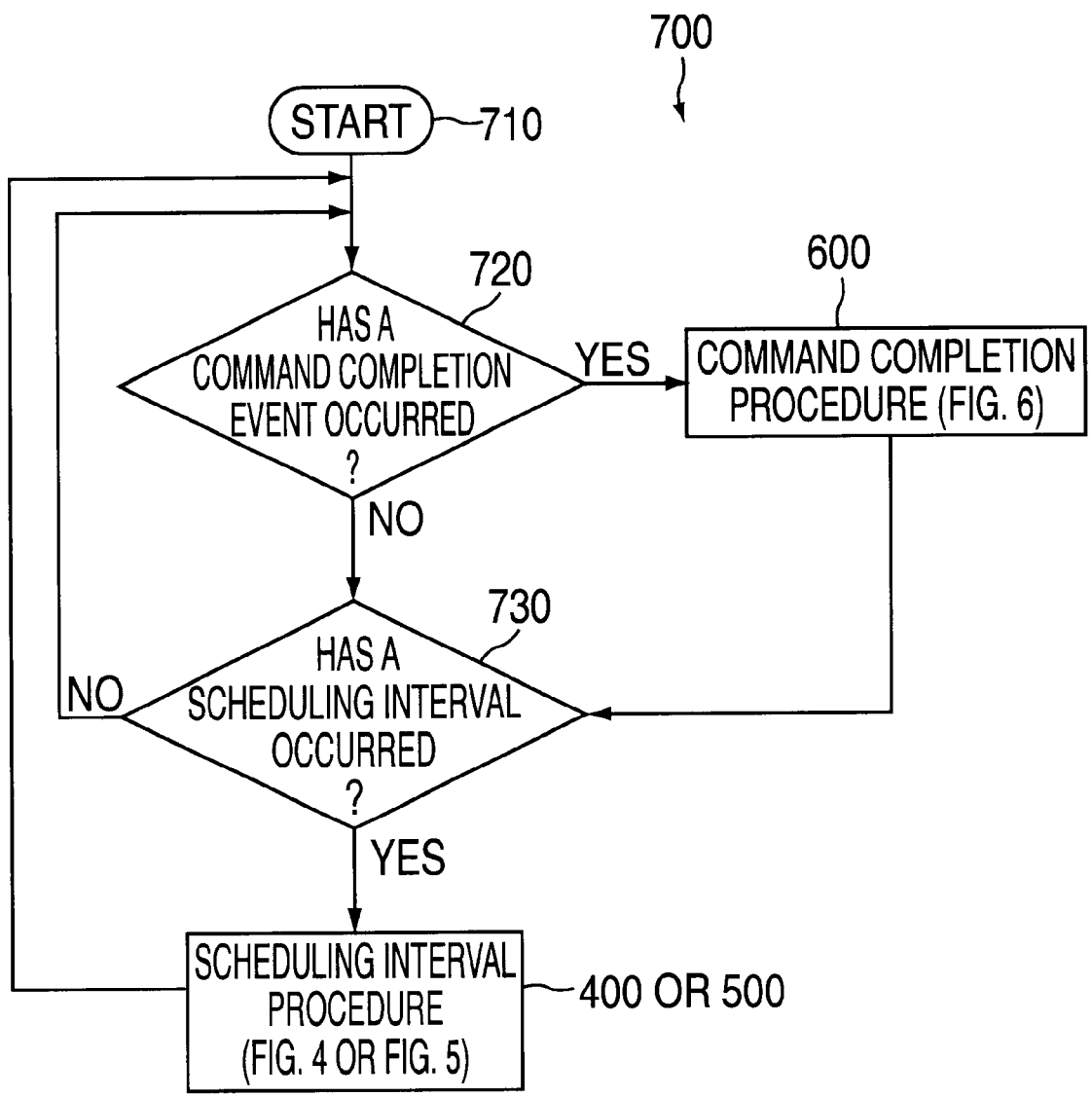
FIG. 7 depicts a flowchart of a method for prioritizing the Scheduling Interval Procedure (FIGS. 4 or 5) and Command Completion Procedure (FIG. 6) of the present invention.

FIG. 7 depicts a flowchart of a method 700 for prioritizing the Scheduling Interval Procedure (FIGS. 4 or 5) and Command Completion Procedure (FIG. 6) of the present invention. The method 700 starts at step 710 and proceeds to step 720. In step 720, it is determined whether a command completion event has occurred. Whenever a command completion event occurs, the Command Completion Procedure is invoked (step 600). Furthermore, in step 730, it is determined whether a scheduling interval has occurred. If, in step 730, a scheduling interval occurs, the Scheduling Interval Procedure is invoked (step 400 or 500). As shown in FIG. 7, if both a scheduling interval and a command completion event occur simultaneously, the command completion is given priority and the Command Completion Procedure (step 600) is executed first. Alternatively, as discussed above, when a disk queue having a depth that is greater than one is used, the execution priority for these procedures is reversed.

Figure 8:
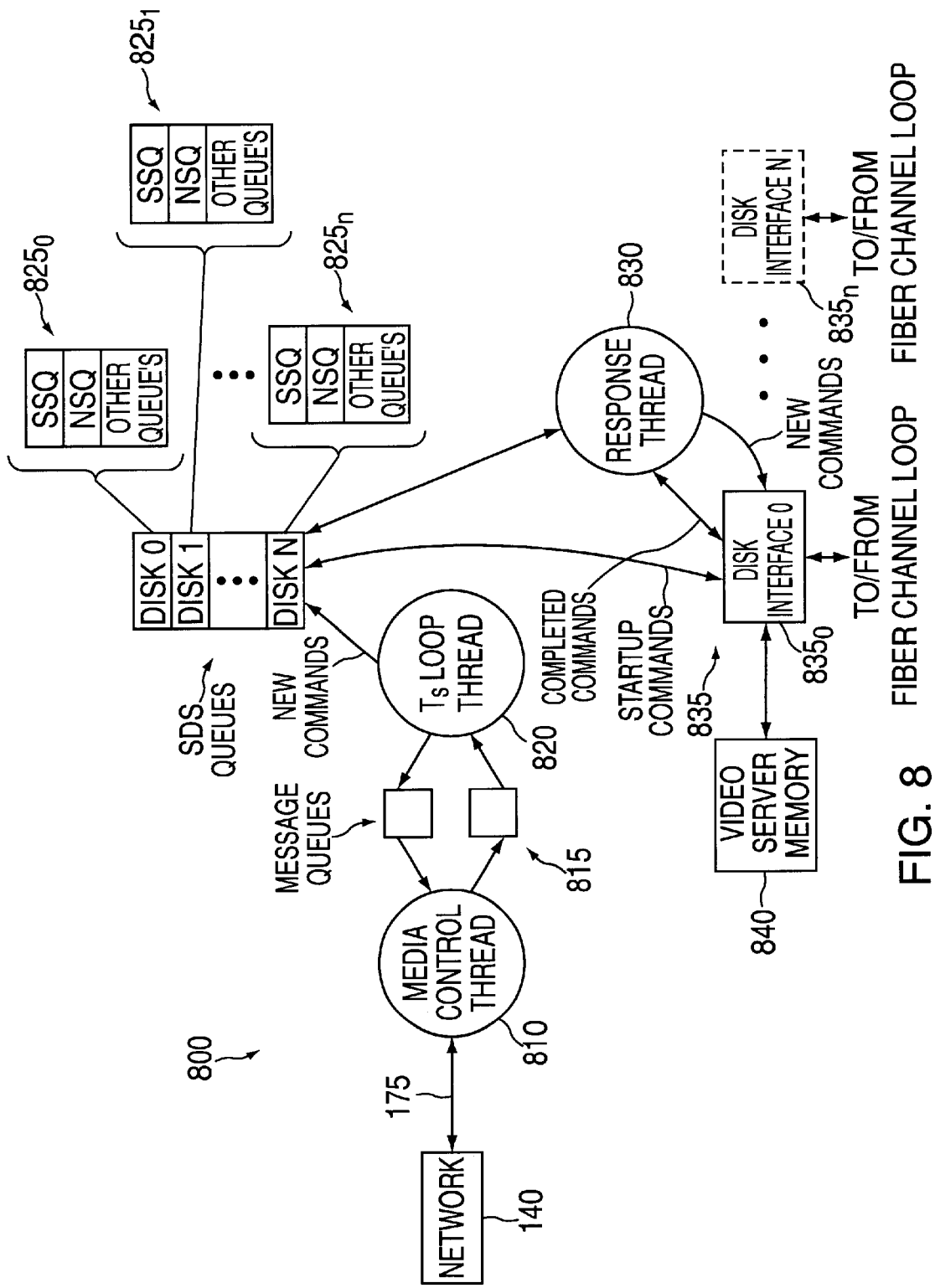
FIG. 8 shows the software process architecture for a preferred multi-threaded implementation of the method of the present invention.

In a preferred embodiment, the method of the present invention is implemented as a multi-threaded process. FIG. 8 shows the software process architecture 800 for the preferred embodiment. The media control thread 810 receives new-subscriber request messages from the transport network 140 and path 175, and forwards these requests through message queues 815 to the $T_s$ loop thread 820. The $T_s$ loop thread 820 is a top level scheduler responsible for two primary functions: first, it maintains all state information necessary to communicate with the disk interfaces 835 ($835_1$ to $835_n$) and video server memory 840; second, it performs the Scheduling Interval Procedure using a period of, for example, 100 ms. The $T_s$ Loop thread 820 allocates the commands to the SDS queues 825, where each disk drive is associated with a set of queues (e.g., SSQ, NSQ and other queues) generally shown as queues $825_0, 825_1, \ldots 825_N$. At the startup condition, when the disks are idle, the initial commands (startup commands) from the $T_s$ loop thread 820 are sent from the SDS queues 825 directly to the disk interfaces 835. Under steady-state operation, a response thread 830 communicates the commands from the SDS queues 825 to the disk drive interfaces 835. Each interface 835 communicates to individual disk drives through a fiber channel loop. Response thread 830 also receives command completion messages from the disk interfaces 835. Upon receiving these messages the response thread performs the Command Completion Procedure (step 600). Media control thread 810, $T_s$ loop thread 820, and response thread 830 are all executed by video server CPU 114 of FIG. 1.

While this invention has been particularly shown and described with references to a preferred embodiment thereof, it will be understood by those skilled in the art that various changes in form and details may be made therein without departing from the spirit and scope of the invention as defined by the appended claims.

What is claimed is:

1. A queuing architecture for scheduling disk drive access requests in an information server, comprising, for each disk drive associated with said information server:

a first queue for disk access requests from users currently receiving information provided by the information server;

a second queue for all other disk access requests; and a queue selector for selecting requests from said first and second queues and forwarding said requests to a disk drive associated with the information server.

2. The queuing architecture of claim 1, wherein said information server determines worst-case disk access times for each request and whether requests in said first and second queues can be executed within the time deadlines of the first queue, assuming said worst-case disk access times.

3. The queuing architecture of claim 1, where requests in said first queue each have an associated time deadline.

4. The queuing architecture of claim 1, where requests in said first queue are ordered from front to back by ascending time deadlines.

5. The queuing architecture of claim 1, where said queue selector gives highest priority to requests in said first queue and lower priority to requests in said second queue.

6. The queuing architecture of claim 1, wherein said information server is a video server and said information is a video program.

7. A queuing architecture for scheduling disk drive access requests in an information server, comprising, for each disk drive associated with said information server:

a first queue for disk access requests from users currently receiving information provided by the information server;

a second queue for all disk access requests from users requesting new data streams;

a third queue for all other disk access requests; and a queue selector for selecting requests from said first, second, and third queues and forwarding said requests to a disk drive associated with the information server.

8. The queuing architecture of claim 7, wherein said information server determines worst-case disk access times for each request, and whether requests in said first and second queues can be executed within the time deadlines of the first queue, assuming said worst-case disk access times.

9. The queuing architecture of claim 7, where requests in said first queue each have an associated time deadline.

10. The queuing architecture of claim 7, where requests in said first queue are ordered from front to back by ascending time deadlines.

11. The queuing architecture of claim 7, where said queue selector gives highest priority to requests in said first queue, a lower priority to requests in said second queue and a lowest priority to requests in said third queue.

12. The queuing architecture of claim 7, where said third queue contains requests for loading content and disk maintenance.

13. The queuing architecture of claim 7, wherein said information server is a video server and said information is a video program.

14. A method of scheduling access requests for a disk drive in an information server, said method comprising the steps of:
  (a) providing at least two queues, where a first queue contains steady-state access requests from users being supplied information from the information server and a second queue for all other types of access requests;
  (b) selecting an access request from said second queue, if such selection does not cause a steady-state access request to miss a time deadline within which the steady-state access request must be completed to ensure that the information being viewed is not interrupted;
  (c) otherwise, selecting one of the steady-state access requests; and
  (d) forwarding the selected request to said disk drive.

15. The method of claim 14 wherein the selecting and forwarding steps are performed repeatedly while an internal queue within the disk drive is not full, and there are outstanding access requests for said disk drive.

16. The method of claim 14 further comprising the steps of checking, before forwarding the selected request to said disk drive, if data for the selected request is in a cache, and discarding the selected request if the data is in said cache.

17. The method of claim 14 wherein the steady-state access request selected in step c is the steady-state access request with the earliest time deadline.

18. A method of scheduling access requests for a plurality of disk drives associated with a video server, said method comprising the steps of:
  ordering said disk drives by earliest time deadline of steady-state access requests for each of said plurality of disk drives; and
  for each of said plurality of disk drives,
  providing three queues, where a first queue contains steady state access requests from users being supplied a program from the video server, a second queue contains new programming access requests and a third queue for all other types of access requests;
  selecting a next new programming access request, if such selection does not cause any steady-state access request to miss its associated time deadline within that steady-state access request must be completed, to ensure that the program being viewed is not interrupted;
  otherwise, selecting a next other access request, if such selection does not cause any steady-state access request to miss its associated time deadline within which that steady-state access request must be completed, to ensure that the program being viewed is not interrupted;
  otherwise, selecting a steady-state access request with the earliest associated time deadline within which that steady-state access request must be completed, to ensure that the program being viewed is not interrupted; and
  forwarding the selected request to a disk drive of said plurality of disk drives that is associated with the selected request.

19. The method of claim 18, where the selecting and forwarding steps are performed repeatedly while an internal queue of the disk drive associated with the selected request is not full, and there are outstanding access requests for the disk drive associated with the selected request.

20. A method of scheduling access requests for a plurality of disk drives associated with a video server, said method comprising the steps of:
  providing, for each of the disk drives associated with said plurality of disk drives, three queues, where a first queue contains steady-state access requests from users being supplied a program from the video server, a second queue contains new programming access requests and a third queue for all other types of access requests;
  determining which of said disk drives has completed a command;
  ordering said disk drives that have completed a command by earliest time deadline of steady-state access requests for said disk drives; and
  for each of said disk drives that has completed a command,
  selecting the next new programming request, if such selection does not cause any steady-state access request to miss its associated time deadline within that steady-state access request must be completed, to ensure that the program being viewed is not interrupted;
  otherwise, selecting a next other type access request, if such selection does not cause any steady-state access request to miss its associated time deadline within which that steady-state access request must be completed, to ensure that the program being viewed is not interrupted;
  otherwise, selecting the steady-state access request with the earliest associated time deadline; and
  forwarding the selected request to a disk drive of said plurality of disk drives that is associated with the selected request.

21. The method of claim 20, where said method is performed every time one of said disk drives has completed a command.

22. The method of claim 20, where said method is performed within a scheduling interval.

* * * * *

UNITED STATES PATENT AND TRADEMARK OFFICE
CERTIFICATE OF CORRECTION

PATENT NO. : 6,378,036 B2 Page 1 of 1
DATED : April 23, 2002
INVENTOR(S) : Jesse S. Lerman et al.

It is certified that error appears in the above-identified patent and that said Letters Patent is hereby corrected as shown below:

Title page,
Item [57], ABSTRACT,
Line 25, delete "internet" and insert instead -- internal --.

Drawings,
FIG. 6, at step 675, delete "LET D + D - dεD" and insert instead -- LET D = D - dεD --.

Column 7,
Line 35, after "the" (second occurrence) insert -- associated --.

Signed and Sealed this

Thirtieth Day of July, 2002

*Attest:*

JAMES E. ROGAN
*Attesting Officer*     *Director of the United States Patent and Trademark Office*